Figure 2:
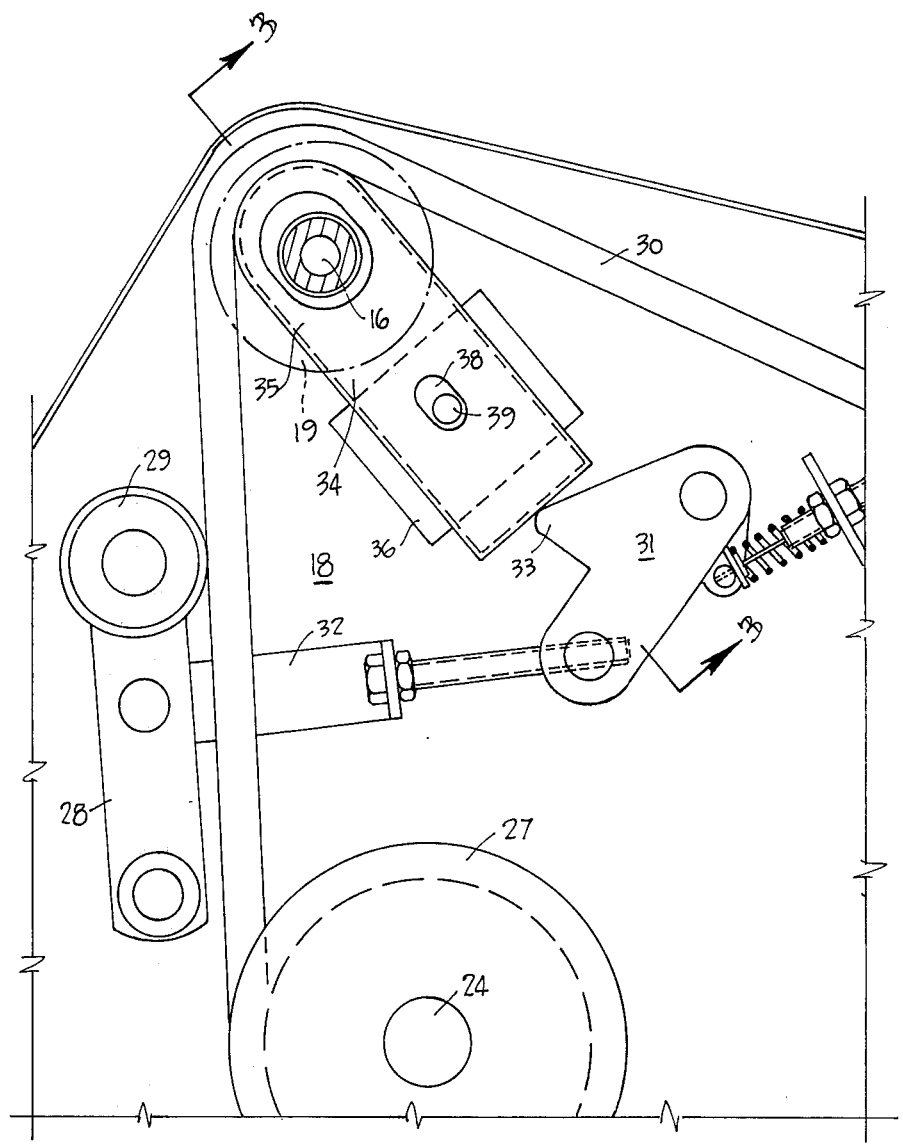

United States Patent [19]

Knight

[11] 4,036,070

[45] July 19, 1977

[54] SLACK BELT CLUTCH

[75] Inventor: Roy George Knight, Thebarton, Australia

[73] Assignee: Scott Bonnar Limited

[21] Appl. No.: 705,625

[22] Filed: July 15, 1976

[51] Int. Cl.² .......................... F16H 7/08; F16H 7/10
[52] U.S. Cl. .............................. 74/242.7; 74/242.15 R
[58] Field of Search ........... 74/242.7, 242.8, 242.15 R

[56]  References Cited

U.S. PATENT DOCUMENTS 2,615,345  10/1952  Ross .................................... 74/242.7
3,825,209   7/1974  Mikkelsen ........................ 74/242.7X Primary Examiner—Leonard H. Gerin
Attorney, Agent, or Firm—Jay L. Chaskin

[57] ABSTRACT

A clutch of the slipping belt type wherein the belt is lifted away from engagement with the driving pulley so as to avoid localized wear on the belt which would otherwise take place.

7 Claims, 3 Drawing Figures

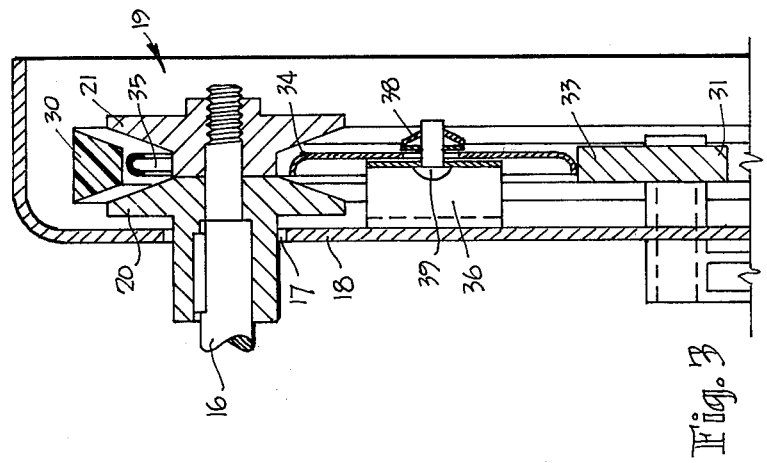
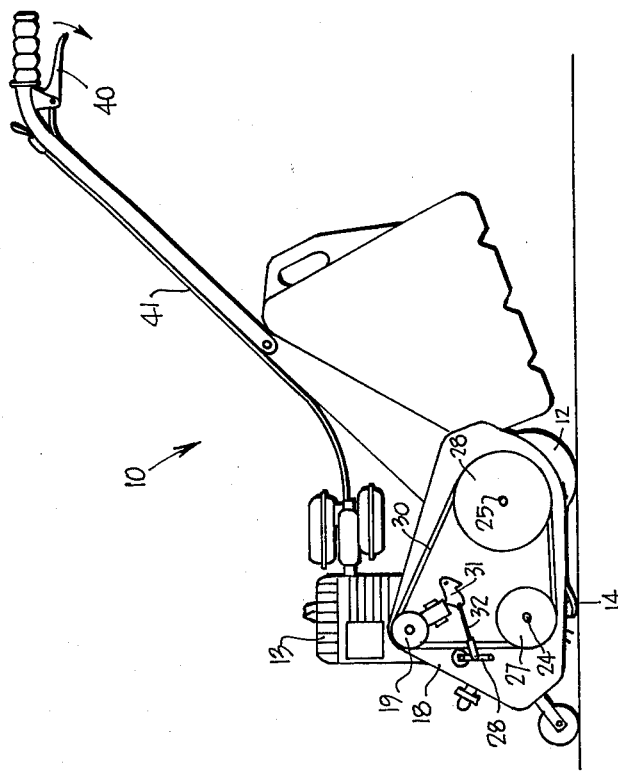

SLACK BELT CLUTCH

This invention relates to a clutch of the so called slack belt type, wherein power transmission is engaged by tightening a slack belt. It also relates to a lawn mower which incorporates such a clutch.

Slack belt clutches are used widely on much equipment including agricultural machines, lawn mowers and the like, because of their inherent simplicity. The usual clutch actuating means comprises a jockey pulley on an arm which, when pivoted to one position, engages the outer belt periphery and tightens the belt to engage driving and driven pulleys with sufficient belt tension to transmit drive. In another commonly used device, either the driving or driven pulley is moved to cause tightening of the belt therebetween. However, slack belt clutches are not entirely free from difficulty, much difficulty being encountered, due to partial engagement of the belt of the driving pulley even when it is slack, causing local belt wear, secondly there being undue wear on the side walls of the belt, and thirdly causing variation in stiffness of the belt.

The main object of this invention is to provide an improvement whereby a slack belt clutch can be employed with a positive disengagement of the belt from the driving pulley.

This invention is characterised by a belt lift device which comprises a belt lift member portion of which lies within the V-belt groove of the driving pulley and which is engageable against the inner periphery of the belt, guide means on an end of the housing guiding the belt lift member for movement, and coupling means coupling the belt lift member and the jockey arm such that pivotal movement of the jockey arm in a direction to disengage drive is simultaneous with movement of the belt lift member to lift the belt from engagement with the walls of the driving pulley groove.

A difficulty which has been encountered with lawn mowers heretofore has been that the drive to the reel and to the rear roller has occupied considerable mower width at one side, and this has made it difficult for example, to mow a lawn adjacent a fence or a wall. With this invention, a mower can utilise a simple, efficient and inexpensive drive which occupies much less width than heretofore.

An embodiment of this invention is described hereunder in some detail with reference to and is illustrated in the accompanying drawings, in which:

FIG. 1 is a side elevation of a lawn mower with a side frame cover removed,

FIG. 2. is a partly sectioned side elevation which shows in more detail the slack belt clutch arrangement and FIG. 3 is a fragmentary section taken on line 3-3 of FIG. 2.

In this embodiment, the slack belt clucth is described with respect to a lawn mower but it will become evident to those skilled in the art that the invention may be applied to machines other than lawn mowers.

In this embodiment a lawn mower 10 is provided with a free running roller 11 at its front end, a driven roller 12 at its rear end, an engine 13 intermediate the rollers and positioned above them, and a cutting reel 14 assembly below the engine 13. The engine 13 has a drive shaft 16 which extends outwardly therefrom in a direction transverse to the direction of travel, the drive shaft passing through an aperture 17 in an end housing 18 of the mower 10, and having a driving pulley 19 on its outer end. The driving pulley 19 comprises an inner pulley portion 20 keyed to engine shaft 16, and an outer pulley portion 21 screwed thereto, as shown in FIG. 3, so that the pulley may be quickly and easily dis-assembled and re-assembled for receiving a belt lift device, which is described below. Both the cutter reel assembly 14 and the rear roller 12 have respective drive shafts (respectively, 24 and 25) also extending through the end housing 18 of the mower frame, the shafts also terminating the belt pulleys (respectively 26 and 27) which are keyed to the respective shafts. A jockey arm 28 is pivoted at one end to the end housing 18 and a jockey pulley 29 carried on the swinging end of the arm is engageable against the outer surface of a V-belt 30 which extends around the pulleys.

A belt lift device comprises a lever arm 31 pivoted to the end housing 18, and coupled by means of a link 32, to the jockey arm 28. The lever arm 31 has on it an abutment finger 33, the abutment finger being arranged to engage a sliding loop 34, the sliding loop 34 extending around the driving pulley and having the loop portion 35 contained in the annular recess at the bottom of the V-groove between the pulley portions 20 and 21. (The loop 34 is replaced in some embodiments with a fork member). The sliding loop 34 is guided for rectilinear movement by the side walls of a "top hat" section bracket 26 which is welded to the end housing. Initial movement of the lever arm moves the jockey pulley in a direction which results in the belt becoming slack, so that little or no drive is imparted from the driving pulley to the belt. Further movement then causes outward movement of the loop portion 35 which engages the belt inner periphery and has the effect of lifting the V-belt 30 from engagement with the walls of the driving pulley 19.

The outward movement of the loop is constrained by the walls of a slot 38 through which a retaining pin 39, passes, (or by channel guide faces). In some instances the loop is provided with a return spring (not shown) which abuts an outstanding tongue on the frame side wall. The lever arm has operative means coupled thereto, in this embodiment being a clutch operating handle 40 by a Bowden cable 41. Conveniently the clutch operating handle is associated with retention means (not shown) so that it occupies one or two positions, in one position the clutch being released and in the other position causing the jockey pulley to apply pressure against the belt so as to ensure a firm frictional engagement between the belt and the three pulleys over which it passes.

In a slight variation of the above which is not illustrated herein, the driving pulley is surrounded with a race (in this embodiment being a ball race), the outer ring of the ball race functioning as guide means for guiding the loop portion 35 in its movement It will of course be seen that the invention can be used on a wide number of applications. The improvement afforded by the invention makes practical a number of applications for slack belt clutches which were otherwise not suitable. If desired, in lieu of the loop urging the belt out of engagement, this may be achieved by a bracket carrying a pair of rollers or slides thereon one positioned on each side of the driving pulley. In such an instance the rollers can be utilized to lift the belt away from the driving pulley as the jockey pulley is relaxed.

I claim:

1. A slack belt clutch wherein a belt extends between a driving and a driven pulley, and clutch actuating means operatively engage the belt or at least one of said pulleys, the clutch actuating means being operable either to tighten the belt to engage said pulleys with sufficient belt tension to engage drive therebetween, or alternatively to loosen the belt so that the belt disengages said drive, comprising a belt lift device engageable against the belt, and coupling means coupling the belt lift device to the clutch actuating means, being so constructed and arranged that actuation of the clutch to cause the belt to be loosely coupled to the pulleys in turn causes the belt lift device to lift the belt from contact with the driving pulley.

2. A slack belt clutch according to claim 1 wherein said belt lift device comprises a belt lift member which, when actuated to lift the belt from contact with the driving pulley, engages the inner periphery of the belt at the locality of the driving pulley.

3. A slack belt clutch according to claim 2 wherein said belt is a V-belt and said driving pulley has a V-belt groove, the belt lift member comprises a loop portion which surrounds the driving pulley, but the belt engaging portion of which lies within the V-belt groove radially inwardly of the belt.

4. A slack belt clutch according to claim 1 wherein said belt is a V-belt and said driving pulley has a V-belt groove, said belt lift device comprising a slidable belt engaging loop portion of a sliding loop, said loop portion being within the V-belt groove radially inwardly of the belt, and guides guiding the sliding loop for movement within the groove to effect said lift of the belt from contact with the driving pulley.

5. A lawn mower comprising a frame, a housing on the frame, an enginge on the frame having a driving pulley coupled for drive directly to the engine, a reel on the mower having a driven pulley coupled directly to the reel, each said pulley having a V-belt groove therein, a V-belt extending between the pulleys, a jockey arm pivoted to an end of said housing, and a jockey pulley journalled for rotation on one end of the jockey arm and engaging the outer periphery of the V-belt, comprising a belt lift device which comprises a belt lift member portion of which lies within the V-belt groove of the driving pulley and which is engageable against the inner periphery of the belt, guide means on an end of the housing guiding the belt lift member for movement, and coupling means coupling the belt lift member and the jockey arm such that pivotal movement of the jockey arm in a direction to disengage drive is simultaneous with movement of the belt lift member to lift the belt from embodiment with the walls of the driving pulley groove.

6. A lawn mower substantially according to claim 5 further comprising a lever arm, pivot means supporting the lever arm from said housing end, a finger on said lever arm engaging said belt lift member, a link extending between the lever arm and the jockey arm such that said lever arm and link constitute said coupling means.

7. A lawn mower substantially according to claim 6 further comprising a clutch operating handle on the mower frame, and a Bowden cable coupling the clutch operating handle to the lever arm.

* * * * *